United States Patent [19]

Heath

[11] 4,258,418

[45] Mar. 24, 1981

[54] VARIABLE CAPACITY DATA BUFFER SYSTEM

[75] Inventor: Chester A. Heath, Boca Raton, Fla.

[73] Assignee: International Business Machines Corporation, Armonk, N.Y.

[21] Appl. No.: 973,938

[22] Filed: Dec. 28, 1978

[51] Int. Cl.³ .............................................. G06F 13/00
[52] U.S. Cl. ................................................... 364/200
[58] Field of Search ... 364/200 MS File, 900 MS File; 235/92 DP, 92 SH

[56] References Cited

U.S. PATENT DOCUMENTS

| 3,836,891 | 9/1974 | McDaniel | 364/900 |
|---|---|---|---|
| 4,040,027 | 8/1977 | Van Es et al. | 364/900 |
| 4,125,870 | 11/1978 | Suzuki et al. | 364/900 |

Primary Examiner—Joseph M. Thesz
Assistant Examiner—Thomas M. Heckler
Attorney, Agent, or Firm—Richards, Harris & Medlock

[57] ABSTRACT

A data buffer system is provided for controlling the transfer of data between a processor and an input/output (I/O) device and includes a data storage device having a maximum data storage capacity value. The data storage device is disposed between the processor and the I/O device for receiving data input from the processor and for outputting data to the I/O device to thereby transfer data from the processor to the I/O device. The data storage device temporarily stores a predetermined amount of data while simultaneously transferring data between the processor and the I/O device. Circuitry is provided for selectively establishing a threshold storage capacity value of the data storage device wherein the threshold storage capacity value is less than the maximum storage capacity value of the data storage device. Circuitry is further provided for maintaining the predetermined amount of data temporarily stored in the data storage device equal to the threshold storage capacity value while the data storage device receives data from the processor and outputs data to the I/O device.

17 Claims, 6 Drawing Figures

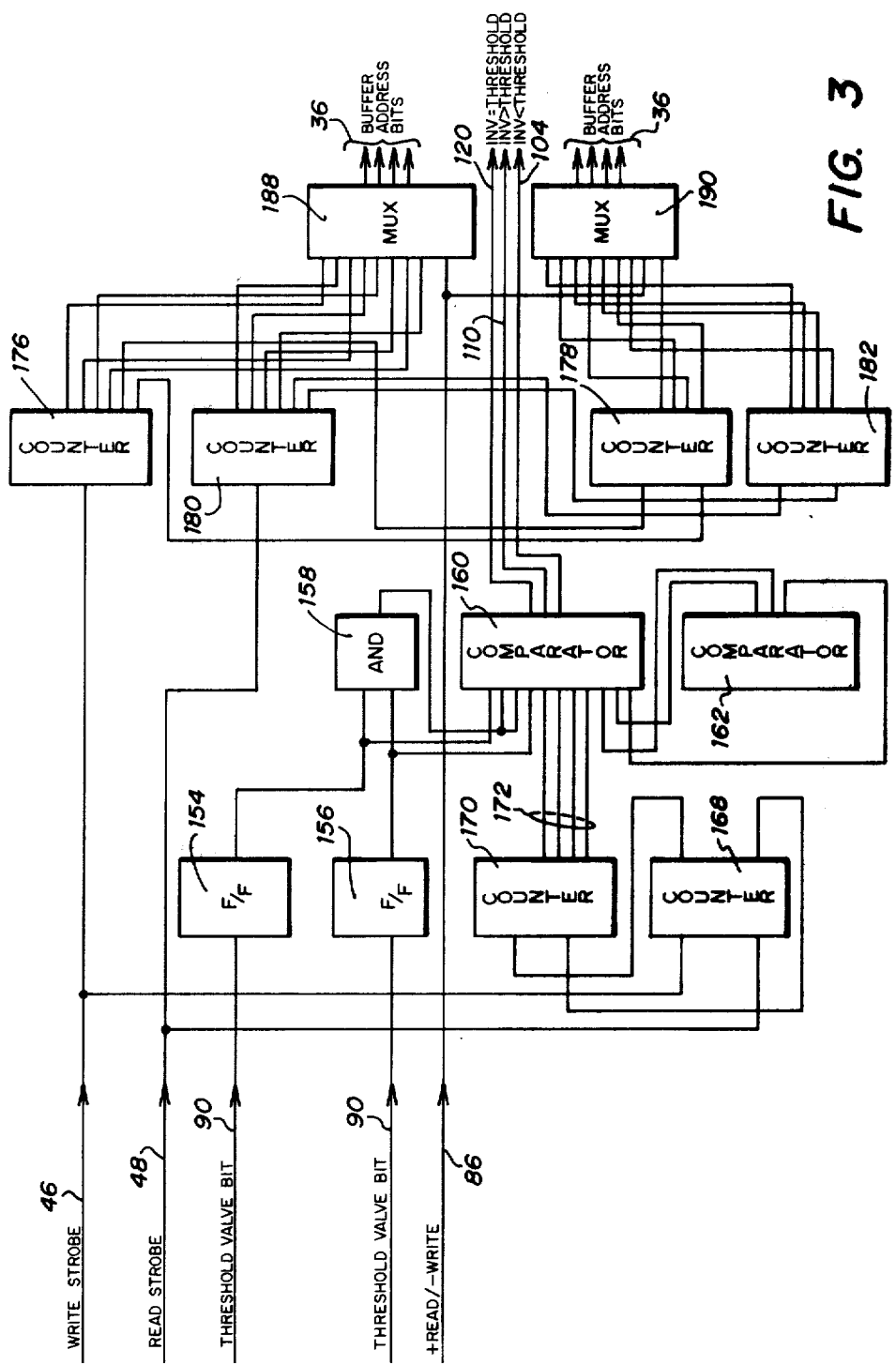

VARIABLE CAPACITY DATA BUFFER SYSTEM

TECHNICAL FIELD

This invention relates to computer systems, and more particularly to a data buffer having a variable capacity for controlling the transfer of data between a central processing unit and input/output (I/O) devices.

BACKGROUND ART

Digital processing or computing systems in which input/output devices are utilized for entering data into the processing system and for retrieving data generated by the processing system typically utilize data buffers for data being supplied to or received from the I/O device. In those processing systems in which the I/O device is a magnetic tape device, it is necessary for the buffer to supply data at a data transfer rate compatible with that of the recording rate of the magnetic tape device. Because there are various other I/O devices requesting data from the processor and because the data transfer rate of the processor is greater than the drive rate of the magnetic tape device, buffering of the data is necessary.

Previously developed I/O device buffering schemes have utilized fixed length buffer storage devices, such as first-in first-out (FIFO) buffer storage and dual FIFO storage buffers referred to as a "Ping-Pong" buffer. A further buffering scheme is described in U.S. Pat. No. 4,125,870 issued to Suzuki et al. on Nov. 14, 1978 and entitled "Information Transfer Control System." These previously developed approaches using fixed length FIFO buffer storage introduce a fixed time delay in the data stream being transferred from the processor to the I/O device.

An additional problem observed with previously developed data buffering devices is that such buffers must be initially full prior to a write command to the I/O device. This condition is necessary to insure that the I/O device will not exhaust the amount of data being transferred after beginning the write operation. The amount of data needed to be held in a data buffer at the start of the write operation varies with the application of the processing system. However, for fixed buffer arrangements it is typically necessary to fill the entire buffer even though the I/O device may not require this amount of data to begin the write operation.

A need has thus arisen for a data buffer to minimize the buffer filling delays and I/O device start/stop delays for various different I/O device unit applications and system conditions. Such a data buffer must be dynamically adjustable to overcome the problems associated with fixed length buffers.

In accordance with the present invention, a variable capacity data buffer is provided for buffering data being transferred to or received from a processor and an I/O device. The buffer size or capacity is dynamically adjustable to minimize buffer filling delays and I/O device start/stop delays and yet provide adequate buffering for various applications and system conditions.

In accordance with the present invention, a data buffer is provided for controlling the transfer of data between a processor, wherein the processor generates command signals, and an input/output device. The data buffer includes a data storage device having a maximum data storage capacity value. The data storage device is disposed between the processor and the input/output device for receiving data input from the processor and for outputting data to the input/output device. The data storage device thereby transfers data from the processor to the input/output device and temporarily stores a predetermined amount of data while simultaneously transferring data between the processor and the input/output device. Logic circuitry is provided for selectively establishing a threshold storage capacity value of the data storage device wherein the threshold storage capacity value is less than the maximum data storage capacity value. Logic circuitry is further provided for maintaining the predetermined amount of data temporarily stored in the data storage device equal to the threshold storage capacity value while the data storage device receives data from the processor and outputs data to the input/output device.

In accordance with another aspect of the present invention, a method of transferring data from a processor to an input/output device includes the step of inputting data from the processor into a data storage device having a maximum data storage capacity. The amount of data input into the data storage device is controlled to a threshold value less than the maximum data storage capacity of the data storage device. A predetermined amount of data is stored within the data storage device. Data is then output from the data storage device while continuously maintaining the predetermined amount of data within the data storage device.

BRIEF DESCRIPTION OF DRAWINGS

For a more complete description of the present invention and for further objects and advantages thereof, reference is made to the following description, taken in conjunction with the accompanying drawings, in which:

FIG. 3 is a schematic logic diagram illustrating the circuitry corresponding to the register, compare circuits, write address register/counter, read address register/counter, inventory register/counter and switch illustrated in block diagram form of FIG. 2;

DESCRIPTION OF THE PREFERRED EMBODIMENT

Figure 1:
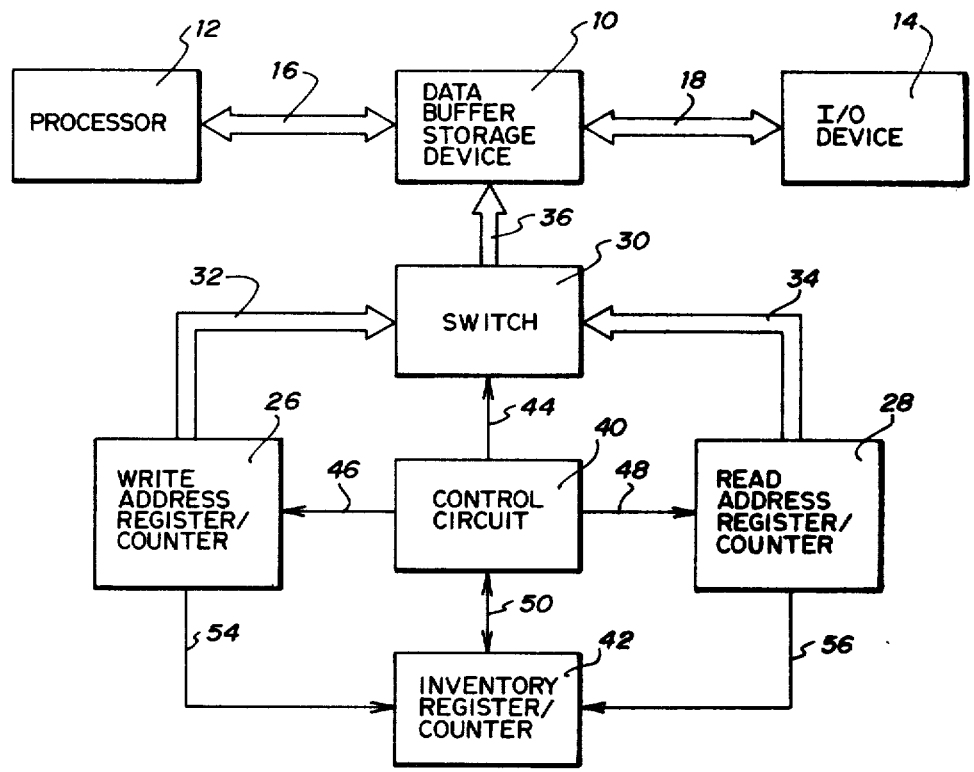
FIG. 1 is a block diagram illustrating a computer system incorporating the data buffer system of the present invention.

FIG. 1 illustrates the present data buffer system including a data buffer storage device 10 interconnected between a processor 12 and an input/output (I/O) device 14. Data is supplied to processor 12 from data buffer storage device 10 and supplied to data buffer storage device 10 from processor 12 via a bidirectional data bus 16. Data is transferred between data buffer storage device 10 and I/O device 14 via a bidirectional data bus 18. Processor 12 may comprise, for example, a Series/1 model 5 minicomputer manufactured and sold by International Business Machines Corporation of Armonk, N.Y. The Series/1 minicomputer is described in the IBM Manual entitled "Series/1 Model 5, 4955 Processor Description," IBM Order No. GA34-0021 (first edition dated November, 1976); IBM Manual entitled "Series/1 4955 Processor Theory," IBM Order No. SY34-0041 (first edition dated January, 1977); and U.S. Pat. No. 4,038,642, entitled "Input/Output Interface Logic for Concurrent Operations," granted to Bouknecht et al. on July 26, 1977 and assigned to International Business Machines Corporation of Armonk, N.Y. I/O device 14 is characterized as being a serially reusable resource that is over-runnable and difficult to restart. Such an I/O device may comprise, for example, a magnetic tape, floppy disc or teleprocessing network.

Associated with data buffer storage device 10 is a write address register/counter 26 and a read address register/counter 28. Write address register/counter 26 supplies address information to a switch 30 via an address bus 32. Read address register/counter 28 supplies read address information to switch 30 via an address bus 34. Data being loaded from processor 12 to data buffer storage device 10 is loaded to an address specified by write address register/counter 26. Similarly, data read from data buffer storage device 10 to I/O device 14 is read out on data bus 18 by an address specified by read address register/counter 28. Switch 30 applies the address from either write address register/counter 26 or read address register/counter 28 via data bus 36 to data buffer storage device 10. Switch 30 functions to select, during the write cycle, the write address from write address register/counter 26 and select, during the read cycle the read address from read address register/counter 28.

FIG. 1 further illustrates a control circuit 40 and an inventory register/counter 42 associated with /the present variable capacity buffer system. Control circuit 40 supplies signals to switch 30 via signal line 44, to write address register/counter 26 via signal line 46, to read address register/counter 28 via signal line 48 and to inventory register/counter 42 via signal line 50. Inventory register/counter 42 receives signals from write address register/counter 26 via signal line 54 and from read address register/counter 28 via signal line 56. Inventory register/counter 42 also communicates with control circuit 40 via signal line 50.

As will subsequently be explained with reference to FIG. 2, control circuit 40 and inventory register/counter 42 function to maintain a predetermined amount or "inventory" of data instantly present in data buffer storage device 10 while data is being input from processor 12 into data buffer storage device 10 and read out from data buffer storage device 10 to I/O device 14. The amount of data contained within data buffer storage device 10 during operation is preselected to a value less than the maximum storage capacity value of data buffer storage device 10. This dynamic adjustment capability in the operation of data buffer storage device 10 minimizes data buffer storage device 10 filling delays and allows data buffer storage devices to accommodate differences in system configurations.

Control circuit 40 and inventory register/counter 42 in combination with write address register/counter 26 and read address register/counter 28 function to maintain the inventory within data buffer storage device 10 at a predetermined differential value between the data being input to data buffer storage device 10 and the data output from data buffer storage device 10. Data will not be permitted to be transferred to I/O device 14 if the inventory value is zero or less than the predetermined threshold value. Data is permitted to be transferred from data buffer storage device 10 to I/O device 14 when the amount of data transferred into data buffer storage device 10 is equal to the threshold value. Through the use of the present invention, control circuit 40 and inventory register/counter 42 dynamically control the size of data buffer storage device 10 to optimize the size of data buffer storage device 10 to system configurations.

Figure 2:
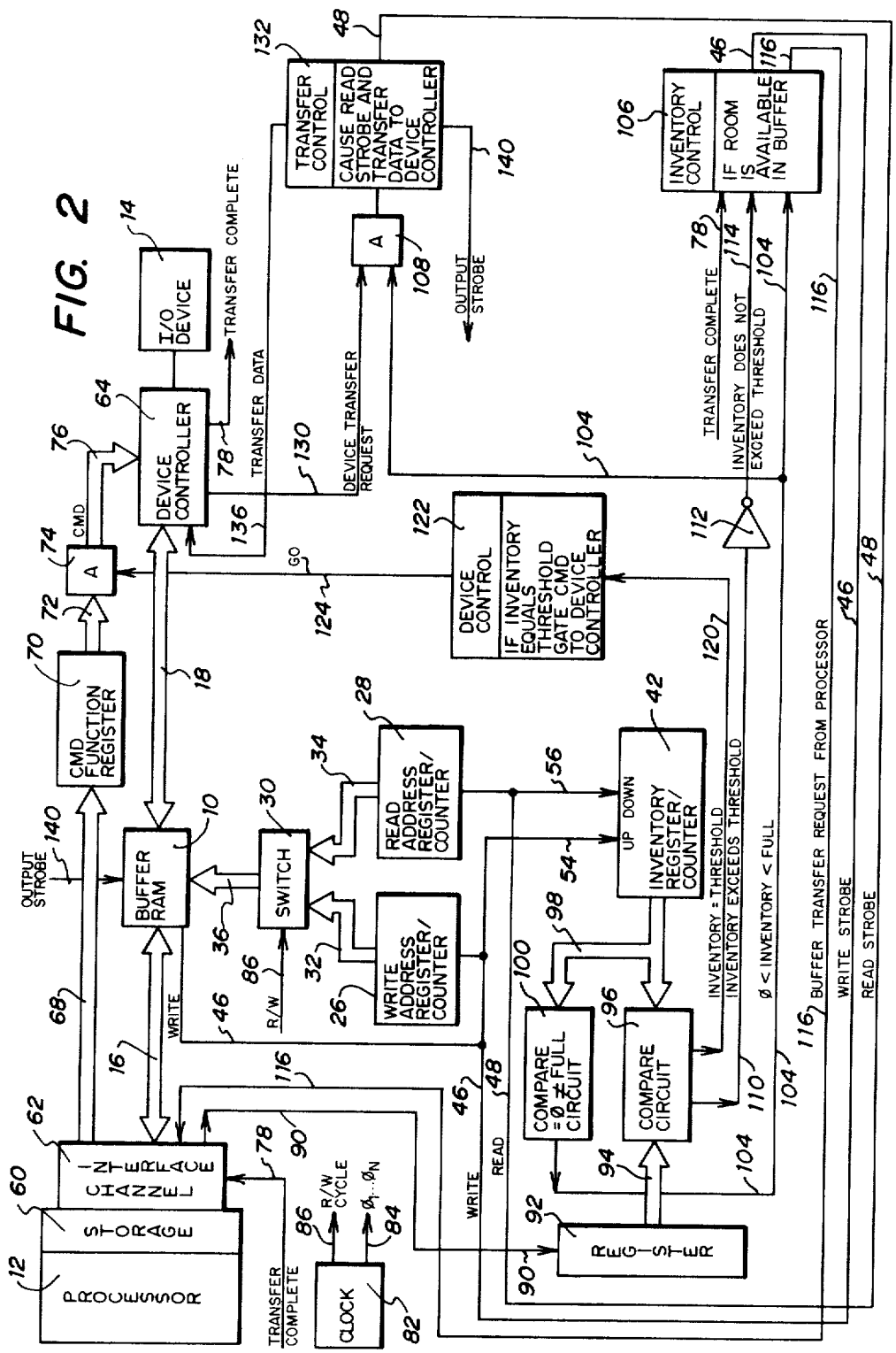
FIG. 2 is a block electrical diagram illustrating in greater detail the data buffer system of the present invention.

Referring to FIG. 2, a detailed logic schematic diagram of the present variable capacity data buffer system is illustrated wherein like numerals are utilized for like and corresponding components previously identified. Processor 12 includes an associated storage 60 and channel interface 62. Data is transferred between channel interface 62 and data buffer storage device 10 via data bus 16 as previously described. Data buffer storage device 10 is illustrated in FIG. 2 as a buffer random access memory (RAM); however, alternatively, data buffer storage device 10 may comprise, for example, a register array, first-in first-out register stack or the like. Data is transferred between data buffer storage device 10 and a device controller 64 associated with I/O device 14 via data bus 18.

Channel interface 62 provides an 8-bit command on a data bus 68 to a command function register 70. The output of command function register 70 is applied by a data bus 72 to an AND circuit 74 whose output is applied via a command data bus 76 to device controller 64. The information stored in command function register 70 instructs device controller 64 with such information as write forward, read reverse, read forward, rewind, go off line or write a file where I/O device 14 is a magnetic tape device. Device controller 64 generates an output signal, TRANSFER COMPLETE, via signal line 78 which is applied to channel interface 62. This signal indicates to processor 12 that the amount of data stored in data buffer storage device 10 has been transferred from processor 12 to I/O device 14.

FIG. 2 also illustrates a clock 82 for generating the necessary clock timing signals, Phase 1 to Phase N via signal lines 84 for maintaining synchronization of the various circuit components. Clock 82 also generates the READ/WRITE CYCLE signal applied via signal line 86 to switch 30 for controlling the application of the write address or read address from write address register/counter 26 and read address register/counter 28 to data buffer storage device 10. Clock 82 may be crystal controlled to eliminate clock phase drift.

Storage 60 associated with processor 12 includes an inventory threshold value selectable through the software program of processor 12 for determining the extent or percentage of the total storage capacity of data buffer storage device 10 that will be utilized. This inventory threshold value is output through channel interface 62 and via signal line 90 to a register 92. In the preferred embodiment, processor 12 outputs through storage 60, channel interface 62 and signal line 90 a 2-bit value to represent 0, 1/16, 9/16 or 15/16 of the total storage capacity of data buffer storage device 10.

The output of register 92 is applied via a data bus 94 to a compare circuit 96. The output of inventory register/counter 42 is applied via a data bus 98 to compare circuit 96 and a compare circuit 100. Inventory register/counter 42 is incremented by an output from write address register/counter 26 via signal line 54 and is decremented by an output from read address register/counter 28 via signal line 56. Therefore, it can be seen that the value stored within inventory register/counter 42 will represent the instantaneous amount of data present within data buffer storage device 10.

The output of compare circuit 100 is applied via signal line 104 to inventory control 106 and an AND circuit 108. The output signal or signal line 104 represents that the inventory contained within data buffer storage device 10 is greater than zero but less than the full storage capacity value of data buffer storage device 10. The output of compare circuit 96 is applied via signal line 110 through an inverter 112 to inventory control 106 via signal line 114. The output of inverter 112 indicates that the inventory does not exceed the threshold value. Inventory control 106 also receives the TRANSFER COMPLETE signal via signal line 78. The output of inventory control 106 generates the WRITE STROBE signal via signal line 46 which is applied to data buffer storage device 10 and write address register/counter 26. A second output of inventory control 106 is the BUFFER TRANSFER REQUEST FROM PROCESSOR signal applied via signal line 116 to processor 12 via channel interface 62.

In operation, inventory control 106 functions to allow data to be input into data buffer storage device 10 until the amount of data equals the threshold value. Initially, the inventory value of data stored within data buffer storage device 10 will be zero as will be the contents of the write address register/counter 26 and read address register/counter 28. Inventory control 106 will output a BUFFER REQUEST FROM PROCESSOR signal to fill data buffer storage device 10. As each of the transfer signals from inventory control 106 is generated, a WRITE STROBE signal will be generated by inventory control 106 to select the write address of write address register/counter 26 in proper synchronization during the write cycle. Additionally, the write address register/counter 26 and inventory register/counter 42 will be incremented. This process of requesting data from processor 12 will continue until the amount of data contained within data buffer storage device 10 or the inventory equals the threshold value.

When the inventory value equals the threshold value, compare circuit 96 will generate the INVENTORY EQUAL THRESHOLD signal via signal line 120 for application to a device control 122. Device control 122 outputs a GO signal via signal line 124 to AND circuit 74. The output of device control 122 is anded with the output of command function register 70 by AND circuit 74 to generate a command via data bus 76 to device controller 64. This command to device controller 64 where I/O device 14 is a magnetic tape device will indicate to I/O device 14 to begin acceleration of the tape. When the magnetic tape has accelerated to the appropriate speed, device controller 64 will generate the DEVICE TRANSFER REQUEST signal via signal line 130 to AND circuit 108. Since the inventory at this time is less than full, being the threshold value which is less than the maximum capacity of data buffer storage device 10, an output is provided from compare circuit 100 via signal line 104 to AND circuit 108. AND circuit 108 therefore generates an output to a transfer control 132.

Transfer control 132 generates the READ STROBE signal via signal line 48 which is applied to read address register/counter 28 to apply a read address to data buffer storage device 10. The READ STROBE signal is also applied via signal line 56 to decrement inventory register/counter 42. Transfer control 132 also generates the TRANSFER DATA signal via signal line 136 applied to device controller 64. With the generation of the OUTPUT STROBE signal from transfer control 132 via signal line 140 to data buffer storage device 10, data will be transferred from data buffer storage device 10 via data bus 18 to device controller 64 and ultimately to I/O device 14.

During data transfer to I/O device 14, the threshold value can be dynamically changed to change the amount of data inventory maintained within data buffer storage device 10 during operation. While transfer control 132 functions to output data from data buffer storage device 10, inventory control 106 functions to control the input of data from processor 12 into data buffer storage device 10. Therefore, transfer control 132 and inventory control 106 functions to maintain the value of inventory previously selected through software by register 92 and yet supply sufficient data from data buffer storage device 10 to I/O device 14.

In summary, control circuit 40 (FIG. 1) includes compare circuits 96 and 100, inventory control 106, device control 122 and transfer control 132. Control circuit 40 functions to compare the contents of inventory register/counter 42 to the threshold value stored in register 92, to maintain the inventory at the preselected value within data buffer storage device 10 and to output data from data buffer storage device 10 when the inventory value equals the threshold value. While control 40 (FIG. 1) has been illustrated in FIG. 2 as discrete logic devices, it will be understood that the functions performed by control circuit 40 can also be performed by a microprocessor.

Referring to FIG. 3, logic circuitry comprising write address register/counter 26, read address register/counter 28, switch 30, inventory register/counter 42, register 92 and compare circuits 96 and 100 of FIG. 2 are illustrated. The threshold value data bits are applied via signal lines 90 to flip flops 154 and 156. Flip flops 154 and 156 may comprise, for example, 7,474 I/Cs and comprise the register 92 (FIG. 2). The output of flip flops 154 and 156 is applied through an AND circuit 158 and directly to a comparator 160. Comparator 160 is interconnected to a comparator 162. Comparators 160 and 162 are 4-bit magnitude comparators and may comprise, for example, 7,485 I/Cs. Comparators 160 and 162 comprise compare circuits 96 and 100 (FIG. 2).

The WRITE STROBE signal via signal line 46 and the READ STROBE signal via signal line 48 are applied to a counter 168 whose output is applied to a counter 170. Counters 168 and 170 are synchronous binary up/down counters and may comprise, for example, 74,193 I/Cs and comprise inventory register/counter 42 (FIG. 2). The output of counter 170 is applied via signal lines 172 to comparator 160. The output of comparator 160 via signal line 104 generates the INVENTORY LESS THAN THRESHOLD SIGNAL, via signal line 110 generates the INVENTORY GREATER THAN THRESHOLD signal and via signal line 120 generates the INVENTORY EQUALS THRESHOLD signal.

The WRITE STROBE signal is applied via signal line 46 to a counter 176 whose output is interconnected to a counter 178. Counters 176 and 178 are binary counters and may comprise, for example, 74,193 I/Cs. Counters 176 and 178 comprise the write address register/counter 26 (FIG. 2). The READ STROBE signal is applied via signal line 48 to a counter 180 whose output is applied to a counter 182. Counters 180 and 182 are binary counters and may comprise, for example 74,193 I/Cs. Counters 180 and 182 comprise the read address register/counter 28 (FIG. 2).

Outputs of counters 176 and 180 are applied to a multiplexer 188. Outputs of counters 178 and 182 are applied to a multiplexer 190. Multiplexers 188 and 190 are 2-line to 1-line data selector/multiplexers and may comprise, for example, 74,157 I/Cs. Multiplexers 188 and 190 comprise switch 30 (FIG. 2) and generate the address bits for data buffer storage device 10 via data bus 36. The output of multiplexers 188 and 190 are strobed using the READ/WRITE signals applied via signal line 86 from clock 82 (FIG. 2).

Figure 4:
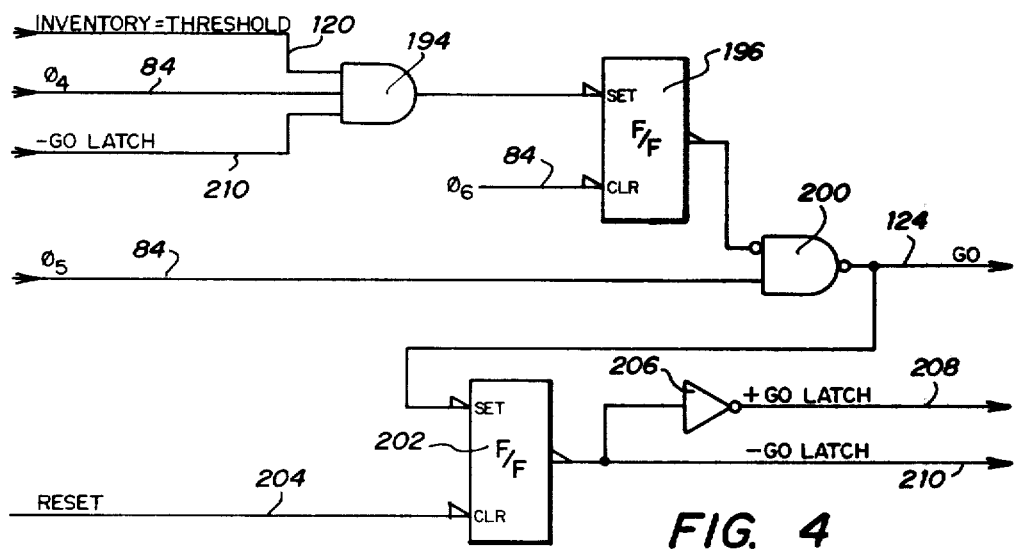
FIG. 4 is a schematic logic diagram illustrating the device control shown in the block diagram of FIG. 2.

Referring to FIG. 4, the logic circuitry corresponding to device control 122 (FIG. 2) is illustrated. The INVENTORY EQUAL THRESHOLD signal is applied via signal line 120 to an AND gate 194 together with the Phase 4 clocking signal via signal line 84. The output of AND gate 194 is applied to a flip flop 196 which also receives the Phase 6 clocking signal from clock 82 (FIG. 2). The output of flip flop 196 is applied to an AND gate 200 which also receives as an input the Phase 5 clocking signal via signal line 84. The output of AND gate 200 generates the GO signal applied via signal line 124 to AND circuit 74 (FIG. 2). The output of an AND gate 200 is also applied to a flip flop 202 which also receives a reset signal via signal line 204 from clock 82. The output of flip flop 202 generates the +GO LATCH signal through an inverter 206 via signal line 208 and the −GO LATCH signal via signal 210 which is applied to AND gate 194.

Figure 5:
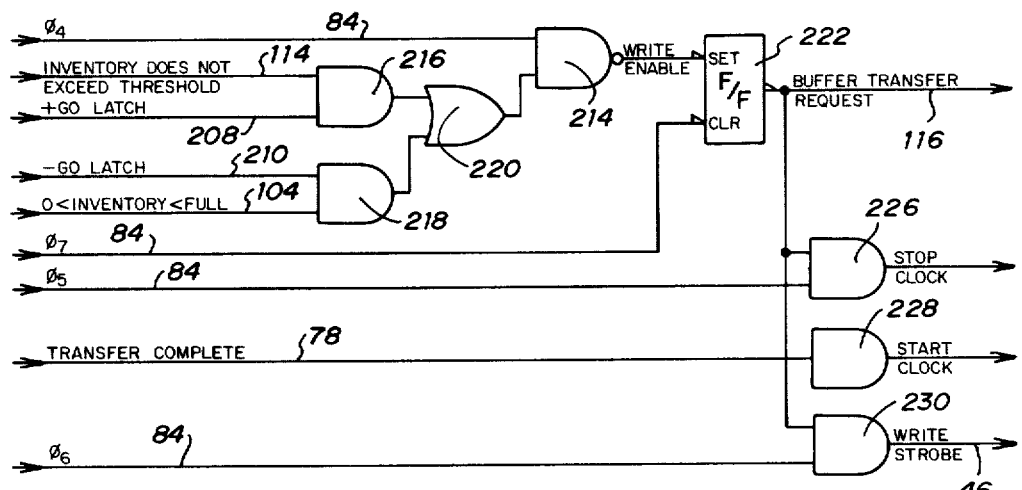
FIG. 5 is a schematic logic diagram illustrating the inventory control shown in the block diagram of FIG. 2.

Referring to FIG. 5 the logic circuitry corresponding to inventory control 106 (FIG. 2) is illustrated. A Phase 4 clocking signal is applied via signal line 84 to an AND gate 214. The INVENTORY DOES NOT EQUAL THRESHOLD signal is applied via signal line 114 to an AND gate 216 together with the +GO LATCH signal via signal line 208. The −GO LATCH signal is applied via signal line 210 to an AND gate 218 together with the INVENTORY GREATER THAN ZERO, LESS THAN FULL signal applied via signal line 104. The output of AND gates 216 and 128 is applied to an OR gate 220 whose output is applied to AND gate 214. The output of an AND gate 214 generates the WRITE ENABLE signal which is applied to a flip flop 222. The output of flip flop 222 generates the BUFFER TRANSFER REQUEST FROM PROCESSOR signal via signal line 116. Flip flop 222 also receives a clear signal via the Phase 7 clocking signal via signal line 84 from clock 82 (FIG. 2).

The output of flip flop 222 is applied to an AND gate 226 which also receives the Phase 5 clocking signal via signal line 84 to generate the STOP CLOCK signal applied to clock 82 (FIG. 2). The TRANSFER COMPLETE signal is applied via signal line 78 to an AND gate 228 to generate the START CLOCK signal applied to clock 82 (FIG. 2). The output of flip flop 222 is also applied to an AND gate 230 which also receives the Phase 6 clocking signal via signal line 86 to generate the WRITE STROBE signal via signal line 46.

Figure 6:
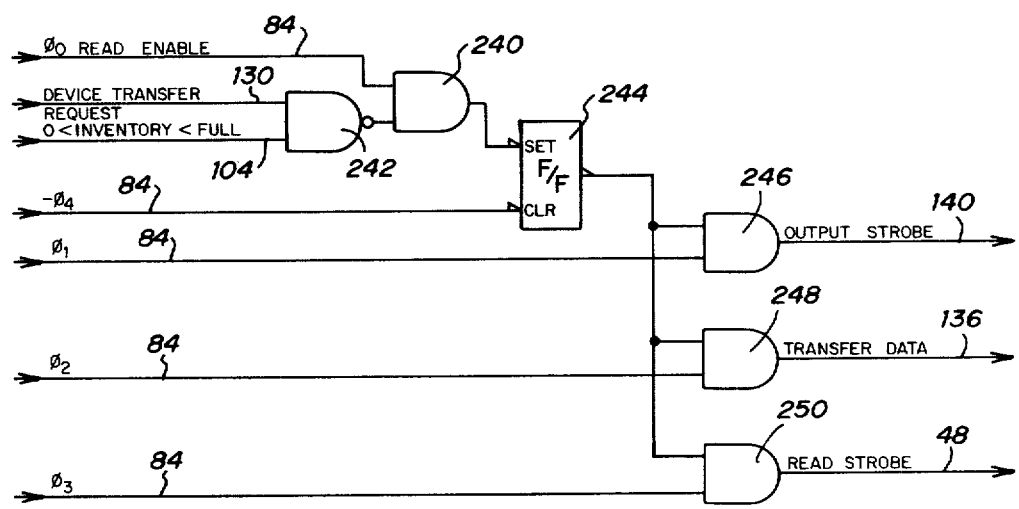
FIG. 6 is a schematic logic diagram illustrating the transfer control shown in the block diagram of FIG. 2.

Referring to FIG. 6, the logic circuitry corresponding to transfer control 132 (FIG. 2) is illustrated. The Phase 0, READ ENABLE, signal is applied via signal line 84 to an AND gate 240. The DEVICE TRANSFER REQUEST signal is applied via signal line 130 together with the INVENTORY GREATER THAN ZERO, LESS THAN FULL signal via signal line 104 to an AND gate 242. The output of AND gate 242 is applied to AND gate 240. The output of AND gate 240 is applied to a flip flop 244 which also receives as an input the Phase 4 clocking signal via signal line 84. The output of flip flop 244 is applied to AND gates 246, 248 and 250. AND gate 246 also receives the Phase 1 clocking signal via signal line 84 to generate the OUTPUT STROBE signal via signal line 140. AND gate 248 also receives the Phase 2 clocking signal via signal line 84 to generate the TRANSFER DATA signal via signal line 136. AND gate 250 receives the Phase 3 clocking signal via signal line 84 to generate the READ STROBE signal via signal line 48.

Although the operation of the present invention has been described in performing a write operation to an I/O device, the present buffer system can also be utilized for performing a read operation to a processor. Since the buffer delay in performing a read operation to a processor is not as significant as in a write operation, it will be understood that the advantages realized by the present system are also attained in performing read operations to a processor.

It therefore can be seen that the present invention provides for a variable capacity data buffer system in which the buffer size or capacity of a data storage device can be dynamically adjusted to minimize buffer filling delays and input/output device start/stop delays for various different I/O device applications and system conditions. The system maintains a predetermined amount of data within the data buffer while continuously reading in data from a processor and reading out data to an I/O device.

Whereas the present invention has been described with respect to specific embodiments thereof, it will be understood that various changes and modifications will be suggested to one skilled in the art, and it is intended to encompass such changes and modifications as fall within the scope of the appended claims.

I claim:

1. A data buffer system for controlling the transfer of data between a processor, wherein the processor generates command signals, and an input/output (I/O) device comprising:

data storage means having a maximum data storage capacity value;

said data storage means being disposed between the processor and the I/O device for receiving data input from the processor and for outputting data to the I/O device to thereby transfer data from the processor to the I/O device;

said data storage means temporarily storing within said data storage means a predetermined amount of data while simultaneously transferring data between the processor and the I/O device;

means responsive to the processor command signals for selectively establishing a threshold storage capacity value of said data storage means wherein said threshold storage capacity value is less than said maximum data storage capacity value; and means interconnected to said data storage means for maintaining said predetermined amount of data temporarily stored in said data storage means equal to said threshold storage capacity value while said data storage means receives data from the processor and outputs data to the I/O device.

2. The data buffer system of claim 1 wherein said means for selectively establishing said threshold storage capacity value includes:

means responsive to the processor command signal for generating a control signal representative of said threshold storage capacity value.

3. The data buffer system of claim 2 wherein said means for maintaining said predetermined amount of data temporarily stored in said data storage means includes:
means for determining the amount of data input from the processor into said data storage means;
means for determining the amount of data output to the I/O device from said data storage means;
means for inputting data from the processor to said data storage means when the amount of input data from the processor is less than the amount of data represented by said control signal;
means for determining the difference in the amount of data input into said data storage means and the amount of data output to the I/O device and for generating a difference signal;
means for comparing said control signal and said difference signal and for generating a transfer signal when said control signal equals said difference signal; and
means for outputting data from said data storage means to the I/O device in response to said transfer signal.

4. The data buffer system of claim 1 wherein said data storage means comprises a first-in first-out data register.

5. The data buffer system of claim 1 wherein said data storage means comprises a random access memory.

6. The data buffer system of claim 1 wherein the input/output device comprises a magnetic tape device.

7. A data buffer system for controlling the transfer of data between a processor, wherein the processor generates command signals, and an input/output (I/O) device comprising:
data storage means having a maximum data storage capacity value;
said data storage means being disposed between the processor and the I/O device for receiving data input from the processor and for outputting data to the I/O device to thereby transfer data from the processor to the I/O device;
said data storage means temporarily storing a predetermined amount of data within said data storage means while simultaneously transferring data between the processor and the I/O device;
means responsive to the processor command signals for generating a control signal representative of a threshold storage capacity value of said data storage means wherein said threshold storage capacity value is less than said maximum data storage capacity value;
logic means for determining the amount of data input from the processor into said data storage means and the amount of data output to the I/O device and for generating a difference signal representing the difference in the amount of data input to said data sytorage means and the amount of data output from said data storage means;
first comparator means for comparing the amount of data input to said data storage means and said control signal;
means responsive to said first comparator means for controlling the amount of data input to said data storage means;
second comparator means for comparing said control signal and said difference signal; and means responsive to said second comparator means for outputting the data temporarily stored in said data storage means to the I/O device.

8. The data buffer system of claim 7 wherein said means responsive to said first comparator means causes the input of data to said data storage means when the amount of data stored within said data storage means is less than said threshold value.

9. The data buffer system of claim 7 wherein said means responsive to said second comparator means outputs data to the I/O device when said control signal equals said difference signal.

10. The data buffer system of claim 7 wherein said logic means includes counting means.

11. The data buffer system of claim 7 wherein said data storage means comprises a firt-in first-out data register.

12. The data buffer system of claim 7 wherein said data storage means comprises a random access memory.

13. A method of transferring data from a processor to an input/output (I/O) device comprising the steps of:
inputting data from the processor into a data storage device having a maximum data storage capacity;
controlling the amount of data input into said data storage device to a threshold value less than the maximum data storage capacity of said data storage device;
storing a predetermined amount of data within said data storage device; and
outputting data from said data storage device while continuously maintaining said predetermined amount of data within said data storage device.

14. The method of claim 13 and further including:
determining the amount of data input into said storage device;
determining the amount of data output to the I/O device;
comparing the amount of data input into said data storage device with said threshold value; and
outputting data to the I/O device at the moment when the amount of data input into said data storage device equals said threshold value.

15. The method of claim 14 and further including:
comparing the amount of data output to the I/O device with the amount of data input into said data storage device to control the amount of data input to said data storage device so as to not exceed said threshold value.

16. A data buffer system for controlling the transfer of data between a processor, wherein the processor generates command signals, and an input/output (I/O) device comprising:
data storage means having a maximum data storage capacity value;
said data storage means being disposed between the processor and the I/O device for receiving data input from the processor and for outputting data to the I/O device to thereby transfer data from the processor to the I/O device;
said data storage means temporarily storing within said data storage means a predetermined amount of data while simultaneously transferring data between the processor and the I/O device;
means responsive to the processor command signals for selectively establishing a threshold storage capacity value of said data storage means wherein said threshold storage capacity value is less than said maximum data storage capacity value; and said predetermined amount of data temporarily stored in said data storage means being initially output to the I/O device when said predetermined amount of data temporarily stored in said data storage means equals said threshold storage capacity value.

17. The data buffer system of claim 16 where said predetermined amount of data temporarily stored in said data storage means is less than said threshold storage capacity value during output of said predetermined amount of data to the I/O device after outputting of data has begun from said data storage means to the I/O device.

* * * * *